Sept. 23, 1930.   R. J. POMEROY   1,776,269
CORRECTION OF COLOR TRANSPARENCIES
Original Filed Dec. 19, 1925
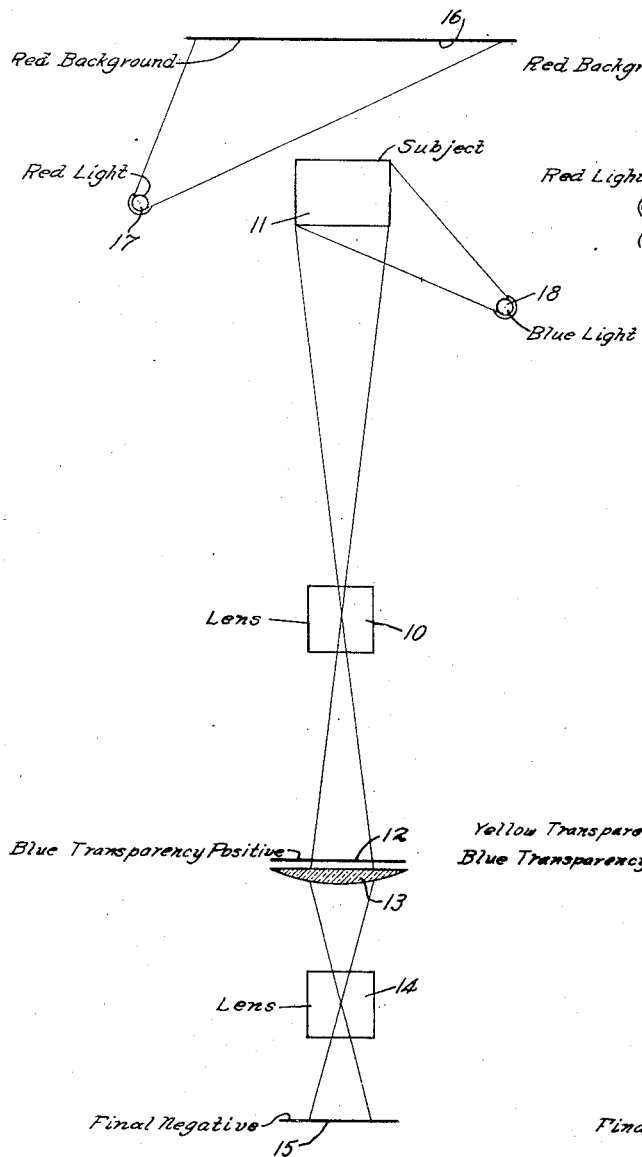
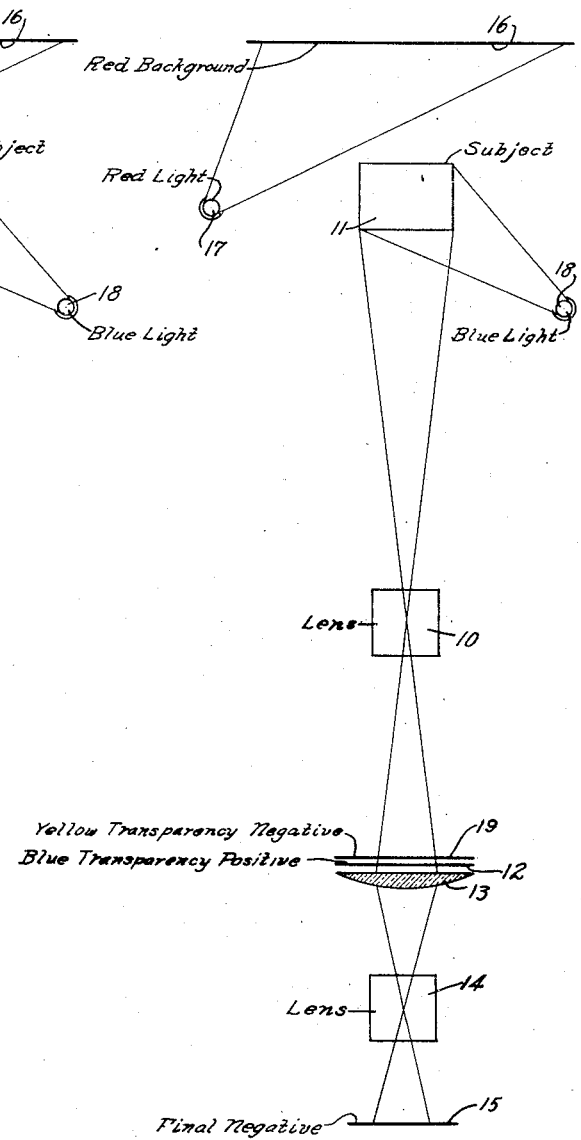
Inventor
Roy J. Pomeroy.
Attorney.

Patented Sept. 23, 1930

1,776,269

UNITED STATES PATENT OFFICE

ROY J. POMEROY, OF LOS ANGELES, CALIFORNIA, ASSIGNOR OF ONE-HALF TO PARAMOUNT FAMOUS LASKY CORPORATION, OF LOS ANGELES, CALIFORNIA, A CORPORATION OF NEW YORK

CORRECTION OF COLOR TRANSPARENCIES

Original application filed December 19, 1925, Serial No. 76,423. Divided and this application filed June 12, 1928. Serial No. 284,787.

This invention has to do with photographic dye color transparencies, or, as they may be known, color dye-image photographic positives or negatives; such transparencies revealing their images in the depth of the colored dye pigment of which the images are composed. A transparency of this nature is nearly or quite uniformly transparent to light of its own color, but its transparency to light of the minus or complementary color varies with the density of the colored pigment of its dye-image.

This application is a division of my original patent entitled "Methods of producing composite pictures," No. 1,673,019, dated June 12, 1928. The subject matter claimed in the present application is particularly adapted to be practiced as an adjunct to the method of the said original patent, and is therefore herein particularly described in that connection, but without necessary limitation thereto.

A transparency of the nature referred to comprises a photographic color-dye image contained upon a transparent film, the dye used in preparing the image being preferably of a single elementary color. If this dye is perfectly pure and uniform in color, the transparency will be perfectly and uniformly transparent to light of its own color. In practice, however, the dye may contain impurities of various colors, and due to their presence a certain percentage of light of the pure dye color is absorbed. The result is that the transparency image possesses a slight property of opacity to light of the color of the pure dye, and shows a slight image when so illuminated. Under certain conditions other factors may also enter into the producing of this image, such, for instance, as a slight difference in shade between the transparency and the light which is used. Whatever the cause, it may become necessary in the practice of certain processes hereinafter described to correct or compensate this condition. And in doing this it may be required, as will appear later, that any such corrective measures do not substantially interfere with the value of the transparency image to light of another color, particularly that of the complementary color.

It is therefore the primary object of the present invention to provide a method of improving the uniformity of transparency of a photographic color dye-image transparency to light of substantially its own color without substantially altering its image value with respect to light of the complementary color.

For the purpose of giving an understanding of my invention, but without intention of imposing a limitation thereupon, I shall describe my invention as utilized in connection with the method of producing composite pictures referred to above, and for this purpose I refer to the accompanying drawings, in which:

Figure 1 is a diagram representing a typical arrangement by which the method of making composite pictures may be carried into effect; and Figure 2 is a diagram of the system of Figure 1 modified by the present invention.

It will be understood that the particular colors herein referred to are not a limitation upon the invention, and that any colors may be used which have the same mutual relations to those herein selected for illustration. The method will be understood to be applicable to either positives or negatives, the term positives and negatives being used throughout in their ordinary photographic sense, that is, a color-dye positive being an image in a single dye color of a scene as it actually appears, while a negative is the photographic reverse, the image being the same color as before, but having the lights and shades reversed, as will be understood. The method of preparing such positives and negatives, although well known, will be hereinafter briefly indicated.

I shall first briefly describe the method of producing composite pictures as set out in my heretofore mentioned original application, and then show how the method of the present invention may be applied thereto. From this it will be apparent how the present invention may be practiced in various other connections.

In the method of producing composite pictures, a negative of the desired background or scene, if it be a still scene, is made upon a single plate, preferably of large size, and in the ordinary manner. From this negative a positive of similar size is made, but for the purpose of this positive I employ a bichromated gelatin so as to get what is known as a bichromated gelatin image; and in printing the positive from the negative it is preferred to print through the celluloid or other base so that the outer face of the bichromated gelatin remains comparatively soft to be dissolved away from a warm water wash and thus produce the gelatin relief, as is well known. Having obtained this gelatin positive, it is next dyed with a suitable dye, which for instance, may be of a blue color. Other colors may be used, blue being merely selected for the purpose of illustration. The positive as thus prepared has a transparent blueness over its whole surface, the "depth" of the blueness varying and by that variation showing the image of the background or scene that was originally taken. To blue light, however, the transparency is almost uniformly transparent, as may be demonstrated by holding the transparency up to the light with a blue filter interposed, when the image substantially disappears. This test may not give perfect results, however, for the reason that some white light may be able to pass through the blue filter, thus not producing pure blue light with which to illuminate the blue transparency. To light as so obtained the blue color in the deeper or heavier parts of the transparency is transparent and clear, and through these deeper blue parts substantially nothing but pure blue light can pass; but through the lighter blue parts a proportionately larger amount of white light may pass, revealing in these parts a faint image when viewed closely. If, however, the transparent positive be held up to the light with a red (or substantially minus-blue) filter behind it, the transparent blue positive is transformed, in effect, into a black and white positive, appearing substantially as would a black and white positive illuminated with red light. This appearance is due to the fact that through the heavier blue parts only blue light can pass, and the red filter passes substantially no such blue light at all, thus causing the heavier blue parts to appear dark; while in the lighter parts, the red light that passes through the filter can also pass at least partially through the thin blue dye. It will thus be seen that the blue positive behaves toward light of its complementary color exactly as does a black and white positive to white light. And this fact is true not only of the colors chosen for illustration, but of any pair of complementary colors. It is of course necessary that the colors be substantially complementary, as light of a color in between the two, as for instance yellow, could partially pass through the bluest parts of the blue transparency, and thus preclude obtainment of the sharp black and white positive effect.

The blue-dye positive transparency, as thus prepared, is ready for use in the optical system of the drawings. Referring to Fig. 1, there is indicated at 10 a lens which casts an image of the subject 11 upon the plane in which the blue transparency 12 is located. Behind this blue transparency there may be located a collector lens 13; and the lens 14, which corresponds to the ordinary motion picture camera lens, is focused upon the blue transparency and therefore also upon the image thrown by lens 10 upon it. Lens 14 is focused on the final negative 15 which, in this particular case, is illustrated as a motion picture film. The method is applicable to either motion or still photography, the process being described with motion pictures in mind because of its present great utility in that field. Behind the subject 11 is a background 16, which is of a minus-blue color— or in other words of a suitable red color. This background may also be illuminated by light of the same color coming from a source such as is indicated at 17. The function of the element 16 is merely to illuminate the blue transparency with red light—so that the red background 16 may be considered simply as a source of uniformly distributed red light.

The subject 11 (usually in motion pictures a subject including things or persons in motion) is illuminated with blue light from a suitable source, as indicated at 18, the lights being so arranged that no red light falls on the subject and no blue light falls on the background.

Blue light from the subject will pass through the blue transparency 12 substantially equally in all parts of that transparency, due to its uniform transparency to blue over its whole surface. Consequently the image of the subject that is finally thrown on the negative 15 by lens 14 is not interfered with by the varying blueness of the positive; and that image in blue light finally thrown on negative 15 is, substantially, just the same as if the transparent positive 12 were not interposed at all. And the subject, of course, intercepts all red light from the background directly behind the subject. The result is that, as to the subject, the final negative takes an image of the subject uninterfered with by the blue transparency or by the red light coming from the background.

At the same time, the red light from the background illuminates all parts of the transparency 12 not occupied by the image of the subject; and this illumination by red light transforms that blue transparency, in effect, into a black and white positive, as I have explained before. Consequently lens 13, taking red light from the blue transparency, in all parts except that occupied by the image of the subject, casts upon final negative 15 a complete image of all the background or scene surrounding the subject. All this takes place simultaneously at a single exposure, so that final negative 15 has cast upon it an image of the subject, in blue light, surrounded by an image of the background or scene in red light. The final negative thus receives the desired composite picture and upon development its shows that composite picture just as if the subject had been taken in the ordinary manner while actually in the depicted scene.

It may be, however, as has previously been stated, that the blue transparency is not perfectly transparent to blue light (shows a slight image when illuminated with blue light); and if this condition becomes sufficiently pronounced, the blue transparency may absorb enough blue light from the subject to cause an image of itself to be superimposed upon the image of the subject in the final negative. This condition may be remedied, according to the present invention, in the following manner. A corrective transparent negative of the background scene of a selected color and tone preferably intermediate of the positive transparency color and the complementary colored light is made and registered with the transparency background positive, as at 19 in Fig. 2. In the present illustrative case, this corrective negative transparency may be of a color intermediate of red and blue—for instance, of a selected shade of yellow. Such a yellow transparent negative may be made by a process similar to that by which the blue transparent positive is made, suitable dyes being used, as is well understood in the art.

This yellow-dye transparency negative, which is ordinarily made quite thin, has the property of absorbing a small proportion of the blue light, but in the main is quite transparent to blue light. The transparency of the yellow transparency to red light is very high, little or no red light being absorbed.

The yellow dye transparency negative 19, positioned in the optical system as indicated in Fig. 2, therefore, in effect, adds a slight amount of opacity to the blue transparency as regards blue light; but since the yellow transparency is a negative, it adds a certain amount of opacity to the lighter blue parts while adding no appreciable amount to the heavier parts, as will be understood from a consideration of the inherent relation between the respective lights and shades of positives and negatives. The effect as regards blue light is then that the lighter blue areas of the positive become slightly more opaque with respect to the heavier blue areas, thus reducing the differences between the lights and shades and accordingly lessening the distinctness of the transparency image. With the proper choice of color and shade in the corrective transparency negative, the differences between the lights and shades of the transparency image need be reduced but slightly to do away entirely with any noticeable image to blue light. The yellow transparency is sufficiently transparent to blue light that the transmission of blue light from the subject to the final negative is not materially interfered with; and as the yellow transparency may be perfectly transparent to red light for all practical purposes, the passage of red light is not affected. Briefly summing up, the fact that the yellow transparency is a negative causes it to add opacity to the thinner parts of the blue positive without adding any substantial amount of opacity to the heavier parts of the blue positive. Being of a yellow color, and thus being capable of partially passing blue light and of nearly perfectly passing red light, it will be seen that it will add to the more transparent blue portions just the slight additional opacity to blue that is desired; and at the same time it will not noticeably change the transparency to red light.

It will be seen that the essence of the invention lies in the use of a corrective transparency negative of a selected color and shade quite transparent to either red or blue light, but which has the power to absorb enough of blue light that any transparency image to blue light is precluded.

Stated broadly, the requirements are that the transparency negative must be of a color and shade to have a relatively high and uniform transparency to light both of the transparency color and its complementary color, but which has enough absorption to light of the transparency color to preclude the formation of an image to light of that color. It will be apparent, upon consideration of the fundamentals involved, that other colors aside from yellow meet the requirements for the corrective transparency. For instance, a light pink, or even a neutral gray may be utilized. The use of a gray, or of other colors which will absorb some of the red light, while entirely operative, is not to be preferred as the contrasts between the lights and shades of the transparency image to red light are somewhat reduced in this case. In fact, theoretically the corrective transparency negative may be of any color, exclusive of the color of the transparency positive, or may be of a neutral gray, it being merely required that the corrective transparency absorb some light of the transparency positive color, and transmit a large amount of both the transparency positive color and its complementary color. It is always possible and preferable, however, to select a color for the negative which has the above required properties, and which in addition is practically perfectly transparent to light of the color complementary to that of the positive transparency, as is the yellow transparency to red light in the above illustrative case.

It will be understood that the invention is not limited to the specific colors set out above, as it is entirely practicable to reverse the relation of the two colors, making the transparency red and the background light blue; and further, the method is applicable not only to red and blue, but to any pair of complementary colors, it being merely necessary in any case to select a transparency negative color having properties relative to the color of the transparency positive as hereinbefore set out. The invention is further not to be limited to the specific adaptation to the method of producing composite pictures, but only as defined in the following claims.

I claim:

1. The method of correcting the transparency of a colored transparent dye image to light of its own color that includes, placing in registration with the image a corresponding relatively negative image in transparent dye of a color intermediate the first mentioned color and its complement.

2. The method of correcting the transparency of a colored transparent dye image to light of its own color that includes placing in registration with the image a corresponding relatively negative image, the negative image being of a color other than that of the color of the transparency.

In witness that I claim the foregoing I have hereunto subscribed my name this 8th day of June, 1928.

ROY J. POMEROY.